United States Patent
Mathias et al.

(10) Patent No.: US 6,553,357 B2
(45) Date of Patent: *Apr. 22, 2003

(54) METHOD FOR IMPROVING NEURAL NETWORK ARCHITECTURES USING EVOLUTIONARY ALGORITHMS

(75) Inventors: Keith E. Mathias, Ossining, NY (US); Larry J. Eshelman, Ossining, NY (US); J. David Schaffer, Wappingers Falls, NY (US)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 85 days.

(21) Appl. No.: 09/387,488

(22) Filed: Sep. 1, 1999

(65) Prior Publication Data

US 2002/0174079 A1 Nov. 21, 2002

(51) Int. Cl.[7] .................................................. G06N 3/02
(52) U.S. Cl. .............................. 706/25; 706/15; 706/16; 706/27
(58) Field of Search .............................. 706/25, 27, 15, 706/16, 19; 703/6, 14

(56) References Cited

U.S. PATENT DOCUMENTS

| | | | |
|---|---|---|---|
| 5,140,530 A | 8/1992 | Guha et al. | 395/23 |
| 5,214,746 A * | 5/1993 | Fogel et al. | 706/25 |

(List continued on next page.)

FOREIGN PATENT DOCUMENTS

| | | | | |
|---|---|---|---|---|
| EP | 01797184 A2 | 3/1997 | | G10K/11/178 |
| JP | 10222172 A | 2/1997 | | G10K/11/178 |
| WO | WO9011568 | 2/1990 | | G06F/15/18 |
| WO | WO9828963 | 10/1997 | | H05K/13/04 |

OTHER PUBLICATIONS

Min Woong Hwang; Jin Young Choi; Jaehong Park, Evolutionary projection neural networks, Evolutionary Computation, 1997., IEEE International Conference on, Apr. 13–16, 1997, pp. 667–671.*

Schaffer, J.D.; Whitley, D.; Eshelman, L.J., Combinations of genetic algorithms and neural networks: a survey of the state of the art, Combinations of Genetic Algorithms and Neural Networks, 1992., COGANN–92. International Workshop on, Jun. 6, 1992, pp. 1–37, Jun. 1992.*

(List continued on next page.)

*Primary Examiner*—Wilbert L. Starks, Jr.

(57) ABSTRACT

The noise associated with conventional techniques for evolutionary improvement of neural network architectures is reduced so that of an optimum architecture can be determined more efficiently and more effectively. Parameters that affect the initialization of a neural network architecture are included within the encoding that is used by an evolutionary algorithm to optimize the neural network architecture. The example initialization parameters include an encoding that determines the initial nodal weights used in each architecture at the commencement of the training cycle. By including the initialization parameters within the encoding used by the evolutionary algorithm, the initialization parameters that have a positive effect on the performance of the resultant evolved network architecture are propagated and potentially improved from generation to generation. Conversely, initialization parameters that, for example, cause the resultant evolved network to be poorly trained, will not be propagated. In accordance with a second aspect of this invention, the encoding also includes parameters that affect the training process, such as the duration of the training cycle, the training inputs applied, and so on. In accordance with a third aspect of this invention, the same set of training or evaluation inputs are applied to all members whose performances are directly compared.

15 Claims, 2 Drawing Sheets

U.S. PATENT DOCUMENTS

| | | | |
|---|---|---|---|
| 5,245,696 A | | 9/1993 | Stork et al. .................... 395/13 |
| 5,249,259 A | | 9/1993 | Harvey ......................... 395/13 |
| 5,394,509 A | | 2/1995 | Winston ....................... 395/13 |
| 5,410,636 A | * | 4/1995 | Masuoka et al. ............. 706/25 |
| 5,781,698 A | | 7/1998 | Teller et al. .................. 395/13 |
| 5,832,466 A | | 11/1998 | Feldgajer ..................... 706/13 |
| 6,023,693 A | * | 2/2000 | Masuoka et al. ............. 706/25 |

OTHER PUBLICATIONS

Medsker, Larry R., Hybrid Intelligent Systems, Kluwer Academic Publishers, Jan. 1995, pp. 127–140.*

Holland, John H., Adaptation in Natural and Artificial Systems, Jan. 1992, The MIT Press, pp. 12–15 and 17.* de Castro, L.N.; Iyoda, E.M.; Von Zuben, F.J.; Gudwin, R., Feedforward neural network initialization: an evolutionary approach, Neural Networks, 1998. Proceedings. Vth Brazilian Symposium on, Dec. 9–11, 1998, pp.: 43–48.*

Shimamoto, N.; Hiramatsu, A.; Yamasaki, K., A dynamic routing control based on a genetic algorithm, Neural Networks, 1993., IEEE International Conference on, Mar. 28–Apr. 1, 1993, pp.: 1123–1128 vol. 2.*

* cited by examiner

METHOD FOR IMPROVING NEURAL NETWORK ARCHITECTURES USING EVOLUTIONARY ALGORITHMS

BACKGROUND OF THE INVENTION

1. Field of the Invention

This invention relates to the field of information processing, and in particular to machine learning, neural networks, and evolutionary algorithms.

2. Description of Related Art

Neural networks are commonly employed as learning systems. Neural networks can be structured in a variety of forms; for ease of understanding, a feed-forward neural network architecture is used herein as a paradigm for neural networks, although the application of the principles presented herein will be recognized by one of ordinary skill in the art to be applicable to a variety of other neural network architectures. A typical feed-forward neural network comprises one or more input nodes, one or more output nodes, and a plurality of intermediate, or hidden, nodes that are arranged in a series of layers between the input and output nodes. In a common neural net architecture, each input node is connected to one or mode hidden nodes in a first layer of nodes, each hidden node in the first layer of nodes is connected to one or more hidden nodes in a second layer of nodes, and so on until each node of the last layer of hidden nodes is connected to each output node. The output of each node is typically a nonlinear function of a weighted combination of each input to the node. In a feedforward neural net, when a set of input values is applied to the input nodes, the weighted values are propagated through each layer of the network until a resultant set of output values is produced. Other configurations of nodes, interconnections, and effect propagation are also common. For example, in some architectures, a node may be connected to one or more other nodes beyond its immediately adjacent layer.

In a learning mode, the resultant set of output values is compared to the set of output values that a properly trained network should have produced, to provide an error factor associated with each output node. In the case of pattern matching, for example, each output node may represent a likelihood that the input pattern corresponds to a particular class. Each input pattern is pre-categorized to provide an "ideal" set of likelihood factors, and the error factor is a measure of the difference between this "ideal" set and the set of output node values that the neural network produced. The error factor is propagated back through the network to modify the weights of each input to each node so as to minimize a composite of the error factors. The composite is typically the sum of the square of the error factor at each output node. Conceptually, the node weights that contributed to the outputs of the incorrect class are reduced, while those that contributed to the output of the correct class are increased.

Although the error factor can be propagated back based on each comparison of the ideal output and the result of processing each input set, preferably, a plurality, or batch, of input sets of values is applied to the network, and an accumulated error factor is back-propagated to readjust the weights. Depending upon the training technique employed, this process may be repeated for additional sets or batches of input values. The entire process is repeated for a fixed number of iterations or until subsequent iterations demonstrate a convergence to the "ideal", or until some other termination criterion is achieved. Once the set of weights is determined, the resultant network can be used to process other items, items that were not part of the training set, by providing the corresponding set of input values from each of the other items, to produce a resultant output corresponding to each of the other items.

The performance of the neural network for a given problem set depends upon a variety of factors, including the number of network layers, the number of hidden nodes in each layer, and so on. Given a particular set of network factors, or network architecture, different problem sets will perform differently. U.S. Pat. No. 5,140,530 "GENETIC ALGORITHM SYNTHESIS OF NEURAL NETWORKS", issued Aug. 18, 1992 to Guha et al, and incorporated by reference herein, presents the use of a genetic algorithm to construct an optimized custom neural network architecture. U.S. Pat. No. 5,249,259 "GENETIC ALGORITHM TECHNIQUE FOR DESIGNING NEURAL NETWORKS", issued Sep. 28, 1993 to Robert L. Harvey, and incorporated by reference herein, presents the use of a genetic algorithm to select an optimum set of weights associated with a neural network.

Genetic algorithms are a specific class of evolutionary algorithms and the term evolutionary algorithm is used hereinafter. Evolutionary algorithms are commonly used to provide a directed trial and error search for an optimum solution wherein the samples selected for each trial are based on the performance of samples in prior trials. In a typical evolutionary algorithm, certain attributes, or genes, are assumed to be related to an ability to perform a given task, different combinations of genes resulting indifferent levels of effectiveness for performing that task. The evolutionary algorithm is particularly effective for problems wherein the relation between the combination of attributes and the effectiveness for performing the task does not have a closed form solution.

In an evolutionary algorithm, the offspring production process is used to determine a particular combination of genes that is most effective for performing a given task. A combination of genes, or attributes, is termed a chromosome. In the genetic algorithm class of evolutionary algorithms, a reproduction-recombination cycle is used to propagate generations of offspring. Members of a population having different chromosomes mate and generate offspring. These offspring have attributes passed down from the parent members, typically as some random combination of genes from each parent. In a classic genetic algorithm, the individuals that are more effective than others in performing the given task are provided a greater opportunity to mate and generate offspring. That is, the individuals having preferred chromosomes are given a higher opportunity to generate offspring, in the hope that the offspring will inherit whichever genes allowed the parents to perform the given task effectively. The next generation of parents is selected based on a preference for those exhibiting effectiveness for performing the given task. In this manner, the number of offspring having attributes that are effective for performing the given task will tend to increase with each generation. Paradigms of other methods for generating offspring, such as asexual reproduction, mutation, and the like, are also used to produce offspring having an increasing likelihood of improved abilities to perform the given task.

As applied to neural networks, the chromosome of the referenced '530 (Guha) patent represents the architecture of a neural network. Alternative neural networks, those having different architectures, each have a corresponding different chromosome. After a plurality of neural networks have been trained, each of the networks is provided evaluation input sets, and the performance of each trained neural network on the evaluation input sets is determined, based on a comparison with an "ideal" performance corresponding to each evaluation input set. The chromosomes of the better performing trained neural networks are saved and used to generate the next set of sample neural networks to be trained and evaluated. By determining each next generation of samples based on the prior successful samples, the characteristics that contribute to successful performance are likely to be passed down from generation to generation, such that each generation tends to contain successively better performers.

The speed at which a particular neural network converges to an optimal set of weights is highly dependent upon the initial value of the weights in the neural network. Similarly, the likelihood of a particular neural network converging on a "global" optimum, rather than a "local" optimum, is highly dependent upon the initial value of the weights in the neural network. In like manner, the success of a particular neural network may be dependent upon the number of training cycles applied, whereas the cost of applying an unbounded set of training cycles may exceed the benefits derived. Globally, the likelihood of evolving to an optimal architecture may be highly dependent upon the selection of initial chromosomes used in the original ancestral chromosomes. Because of these dependencies on initial conditions, conventional evolutionary algorithms employ random values to initialize most states and conditions of each network, to avoid the introduction of biases that could affect the accuracy of the results. As such, the determination of an optimal neural network architecture via an evolutionary algorithm is an inherently "noisy" process. Potentially better performing architectures may score poorly because of the particular evaluation test set used, or because of inadequate training compared to a less robust architecture that is easily trained, and so on. In like manner, the use of randomly selected training sets or evaluation sets among the evaluated neural networks may cause potentially worthwhile architectures to be rejected prematurely, obviating the advantages realizable by a directed trial and error process.

BRIEF SUMMARY OF THE INVENTION

It is an object of this invention to provide a method for improving neural network architectures via an evolutionary algorithm that reduces the adverse effects of the noise that is introduced by the network initialization process. It is a further object of this invention to reduce the noise that is introduced by the network initialization process. It is a further object of this invention to provide an optimized network initialization process. It is a further object of this invention to reduce the noise that is introduced by the use of randomly selected training or evaluation input sets.

These objects and others are achieved by including parameters that affect the initialization of a neural network architecture within the encoding that is used by an evolutionary algorithm to optimize the neural network architecture. The example initialization parameters include an encoding that determines the initial nodal weights used in each architecture at the commencement of the training cycle. By including the initialization parameters within the encoding used by the evolutionary algorithm, the initialization parameters that have a positive effect on the performance of the resultant evolved network architecture are propagated and potentially improved from generation to generation. Conversely, initialization parameters that, for example, cause the resultant evolved network to be poorly trained, will not be propagated. In accordance with a second aspect of this invention, the encoding also includes parameters that affect the training process, such as the duration of the training cycle, the training inputs applied, and so on. In accordance with a third aspect of this invention, the noise effects caused by the random selection of training or evaluation sets is reduced by applying the same randomly selected training or evaluation set to all architectures that are directly compared with each other.

BRIEF DESCRIPTION OF THE DRAWINGS

The invention is explained in further detail, and by way of example, with reference to the accompanying drawings wherein.

Throughout the drawings, the same reference numeral indicates a similar or corresponding feature or function.

DETAILED DESCRIPTION OF THE INVENTION

Figure 1:
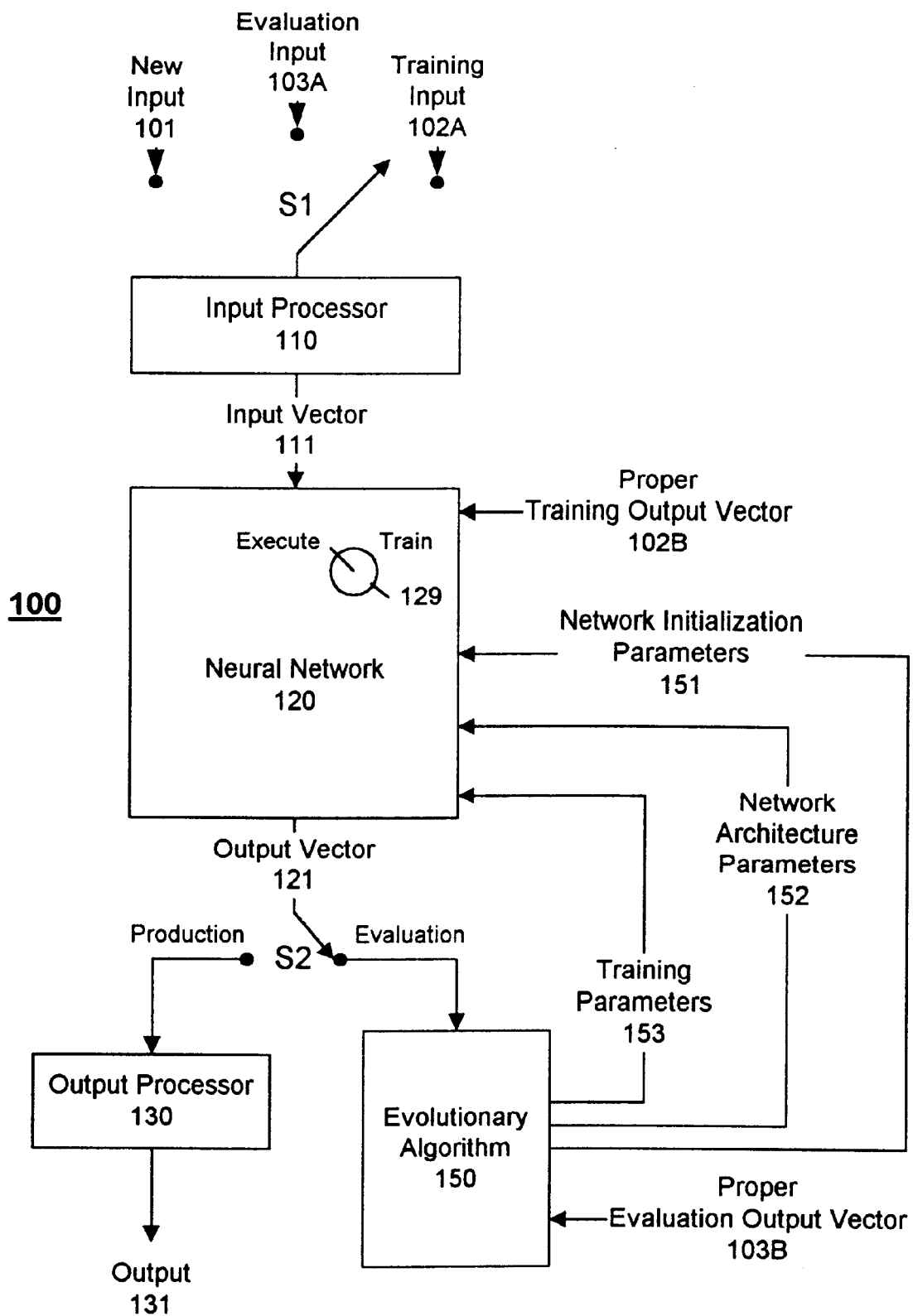
FIG. 1 illustrates an example block diagram of a system for optimizing a neural network in accordance with this invention.

FIG. 1 illustrates an example block diagram of a system 100 for optimizing a neural network 120 in accordance with this invention. The neural network 120 is illustrated as a learning system. When placed in the training mode, via selector 129, the input vectors 111 that are applied to the neural network 120 are derived from a training input 102A, via switch S1. An optional input processor 110 performs the formatting or processing requirements to convert the training input 102A, and other inputs 101 and 103A, into a suitable form 111 for processing by the neural network 120. In response to the input vector 111, the neural network 120 produces an output vector 121, using conventional neural network propagation techniques. As discussed above, the resultant output vectors 121 are dependent upon the architecture of the network (including the number of intermediate node layers between the input and output nodes, the number of nodes at each layer, and their interconnection), as well as the nodal weights assigned to each node.

As discussed above, U.S. Pat. No. 5,140,530 "GENETIC ALGORITHM SYNTHESIS OF NEURAL NETWORKS", incorporated by reference herein, presents the use of a genetic algorithm to construct an optimized custom neural network architecture. Additionally, copending U.S. patent application "IMAGE CLASSIFICATION USING EVOLVED PARAMETERS", U.S. Ser. No. 09/343,649, filed Jun. 29, 1999 for Keith Mathias, Murali Mani, J. David Schaffer, (Disclosure 1504-1346), presents encodings of evolved traits that represent different neural network architecture attributes, such as the number of hidden nodal layers and nodes per layer, and is incorporated by reference herein. Consistent with these referenced documents, the neural network 120 contains some fixed architectural features and constraints, as well as parameterized features that are modifiable by an external input. The evolutionary algorithm device 150 provides the one or more network architecture parameters 152 that affect the architecture of the neural network 120. The evolutionary algorithm device 150 also provides one or more network initialization parameters 151 that affect the initial condition of the neural network 120. In accordance with this invention, as discussed below, these network initialization parameters 151 are encoded in the traits of the sample neural network architectures that are presented to the neural network 150 for evaluation.

The neural network device 120 uses the network initialization parameters 151 and network architecture parameters 152 provided by the evolutionary algorithm device 150 to create a neural network architecture for processing each of the input vectors 111 to produce each output vector 121. Each of a plurality of training inputs 102A is applied to the current architecture of the neural network 150 in a sequential manner. As each output vector 121 is produced, it is compared, within the neural network device 120, to an output vector value 102B that a properly trained neural network device 120 should produce in response to the input 102A being applied. Using conventional feedback techniques, any differences, or errors, between the produced output vector 121 and the proper output vector 102B are used to adjust the nodal weights within the neural network so as to reduce such errors. As noted above, an accumulated error factor, based on a batch of input vectors, is preferably used to adjust the nodal weights, and the entire process is iteratively repeated to further refine the nodal weights.

A number of techniques can be applied to terminate the training cycle. A fixed number of iterations of the training inputs 102A may be applied; the training inputs 102A can be applied until the magnitude of the errors reach a predetermined acceptable limit; the application of training inputs 102A may be terminated after a predetermined time limit; or other termination tests, or combinations of tests, can be applied. In accordance with another aspect of this invention, the evolutionary algorithm device 150 also provides training parameters 153 that affect the training of the currently configured neural network architecture. The training parameters 153 may include, for example, the aforementioned training input quantity or duration limits, error thresholds, and the like.

At the termination of the training cycle, the resultant trained neural network within the device 120 is evaluated, using evaluation inputs 103A, via switch S1. As discussed above, the effectiveness of the training of the neural network, and the neural network itself, is dependent upon the initialization parameters 151, the architecture parameters 152, and the training parameters 153 that are provided to the neural network device 120 by the evolutionary algorithm device 150. Thus, an evaluation of the trained neural network provides a measure of effectiveness of the particular provided parameter set 151, 152, 153. Within the evolutionary algorithm device 150, the effectiveness of the trained neural network is determined by applying a sequence of evaluation inputs 103A and comparing the resultant output vectors 121 with corresponding proper evaluation output vectors 103B. A composite measure of the differences between each output vector 121 and each proper output vector 103B is associated with the parameter set 151, 152 as a measure of effectiveness for the parameter set 151, 152, 153.

By applying different parameter sets 151, 152, 153 and repeating the above training and evaluation process, a measure of effectiveness can be determined for each of these different parameter sets 151, 152, 153 and the most effective parameter set 151, 152, 153 can be identified and selected for use in the neural network device 120 for processing new inputs 101, inputs that do not have predetermined proper outputs, to produce new outputs 131 that are likely to be consistent with a proper output. That is, for example, if the neural network system 100 is trained and evaluated for classifying images, using training 102A and evaluation 103A input images that have corresponding proper output classifications 102B and 103B that are determined by a human expert, a new output classification 131 corresponding to a new input 101 can be expected to be consistent with a classification that the human expert would determine for the input 101. A more effective neural network can be expected to provide a classification 131 that is more likely to be consistent with the result that the human expert would provide.

Figure 2:
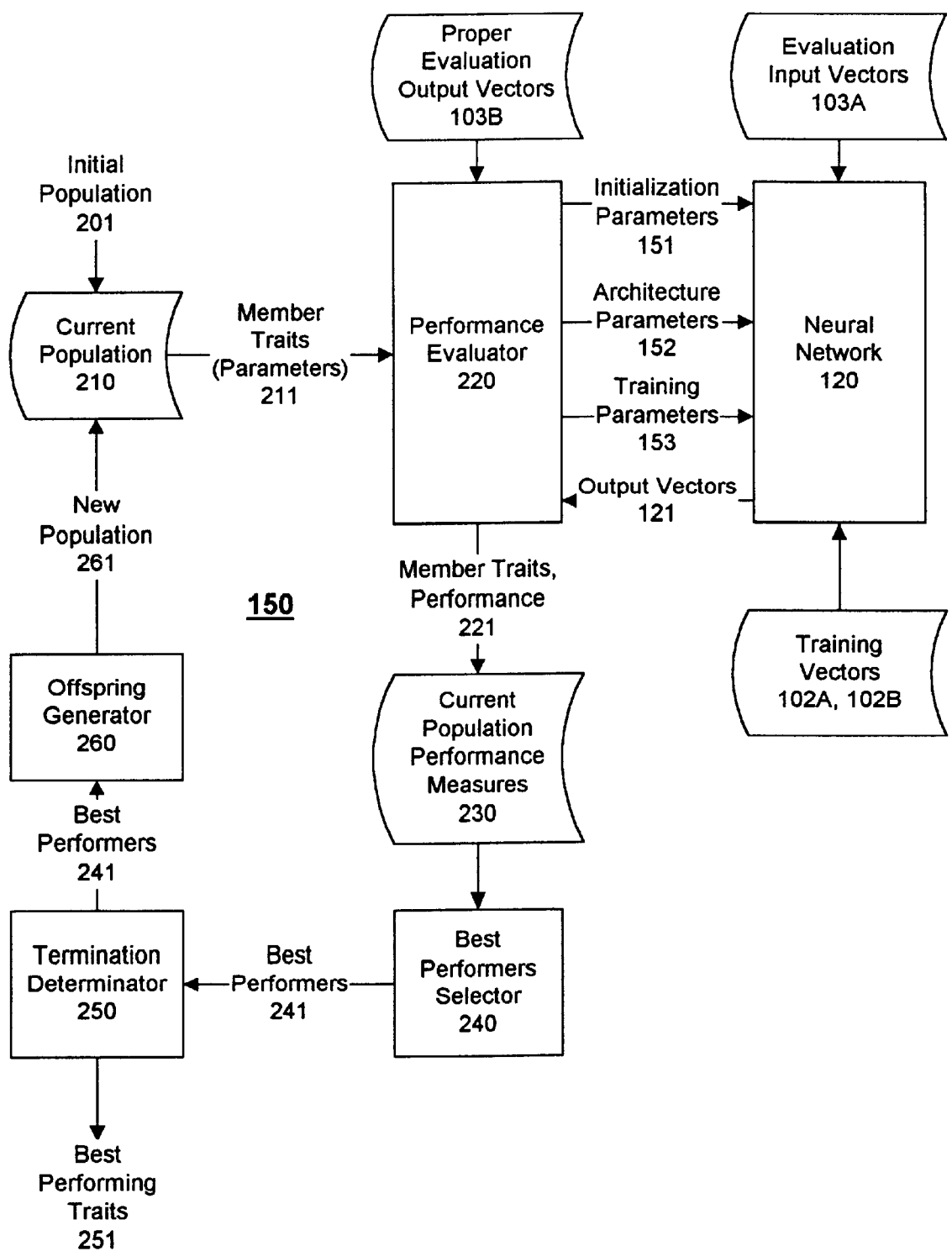
FIG. 2 illustrates an example flow diagram for optimizing a neural network system in accordance with this invention.

FIG. 2 illustrates an example flow diagram for determining and applying different parameter sets 151, 152, 153 to a neural network system 100 in a directed trial and error search for an optimal neural network system architecture. This directed trial and error search is effected via an evolutionary algorithm, as would be embodied in the evolutionary algorithm device 150. An initial population 201 of sample parameter sets is created and stored as traits 211 of a current population 210, using conventional evolutionary algorithm encoding techniques. Each trait 211 typically corresponding to a gene or set of genes in a chromosome associated with each member of the population 210.

In contrast to conventional systems, the traits 211 of the population 210 include an encoding that provides at least one parameter 151 that affects the initial condition of the neural network 120, or at least one parameter 153 that affects the training of the neural network 120. For example, the encoding may specifically include randomly generated values for each nodal weight of the nodes in the neural network 120, or, for ease of coding, may include a seed value that is used to initialize a random number generator that generates each nodal weight in the neural network 120. In like manner, the encoding may be an index to a list of random values, or to a list of seeds for a random number generator. As is common in the art, a conventional random number generator, typically termed a pseudo-random number generator, repeatedly provides the same sequence of "random" numbers following an initialization with the same seed. In the illustrated example of FIG. 2, the performance evaluator 220 includes the functions, such as the aforementioned pseudo-random number generator, required to transform the member traits 211 into the initialization parameters 151, architecture parameters 152, and training parameters 153 that are provided to the neural network 120.

The traits 211 of each member of the population 210 are provided to the performance evaluator 220. The performance evaluator 220 provides the parameter set 151, 152, 153 to the neural network system 100. As discussed above, the neural network system 100 configures and initializes a neural network 120 corresponding to the provided parameter set 151, 152, applies the input training vectors 102A corresponding to the provided training parameters 153, and adjusts the nodal weights of the configured neural network based on the proper output training vectors 102B.

After the neural network that corresponds to the provided parameter set 151, 152, 153 is trained, it is evaluated as discussed above by applying evaluation input vectors 103A. The performance evaluator compares each output vector 121 corresponding to each evaluation input vector 103A with each proper evaluation output vector 102B, to form a measure of performance 221 associated with the particular parameter set 151, 152, 153. Because the parameter set 151, 152, 153 is derived from the particular member traits 211, the measure of performance 221 is likewise associated to the member.

Each member's traits 211 of the current population 210 are similarly processed so as to determine a measure of performance associated with each member of the current population 210. A selector 240 selects the better performing members of the current population 210 to provide a set of the best performers 241. A termination detector 250 determines whether to continue or terminate the search for an optimal neural network architecture, as discussed below. If the search is continued, the best performers 241 are provided to an offspring generator 260. The offspring generator 260 generates a new population 261 based on the traits of the best performing members 241. Any one of a variety of techniques, common in the art of evolutionary algorithms, can be applied to generate the new population 261, such as reproduction, pairwise recombination, mutation, and so on.

Depending upon the evaluation methods employed, the new population 261 may include both prior members of the population 210 as well as the newly generated offspring. If the same set of training 102A and evaluation 103A input vectors will be applied to each new current population 210, then there is no need to evaluate a member more than once. If random or changed input vectors are used, the new population will preferably include the prior members who performed well with a different set of input vectors, so that a comparable measure of performance can be obtained at each generation. That is, to minimize the likelihood of one member performing better or worse than another because of the training or evaluation sets applied to each, all members that are directly compared to each other are compared based on the same set of training or evaluation sets. In a preferred embodiment of this invention, a random selection of training 102A and evaluation 103A input vectors are selected at each generation. This randomly selected set of training 102A and evaluation 103A input vectors are applied to both the newly generated offspring, as well as the best performing members 241. In this manner, the subsequent best performance selection, at 240, is provided the measures of performance for each member based on the same set of training and evaluation vectors. By using a random selection of training and evaluation vectors at each generation, only robust members, those that perform well under a variety of circumstances, are likely to survive from generation to generation.

After each generation and evaluation of a new current population 210, the selector 240 selects a set of best performers 241 from each new current population 210. At some point in time, this process terminates, and the traits 251 of the best performer of the best performers 241 are provided to produce the preferred set of initialization 151 and architecture 152 parameters for production use by the neural network system 100. Because each new generation of offspring is determined based on the traits of the better performing members of the prior generation(s), the "best of the best" traits 251 are likely to provide an optimum, or near optimum, configuration of the neural network system 100.

The termination of the evolutionary process at 250 may be effected in a variety of ways. Generations of new members may be processed until a given time limit is reached, or until the variance among the best performers 241 is minimal, or until a given level of performance is achieved, or any combination of such criteria, as is common in the art.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the training parameters 153 may also affect the selection of training input vectors 102A. For example, the trait 211 that determines the training parameter 153 may be a seed for a random number generator that determines which training vectors 102A to apply to the neural network 120 for training, or may be used to expressly determine particular vectors 102A, and so on. In like manner, other techniques for improving the performance of a neural network, or other trainable system, may be integrated with the techniques of this invention as well.

The particular structures and functions are presented in the figures for illustration purposes. Other system configurations and optimization features will be evident to one of ordinary skill in the art in view of this disclosure, and are included within the scope of the following claims.

We claim:

1. A method for enabling a determination of a preferred neural network architecture, the method comprising:
    enabling an encoding of each chromosome of a plurality of chromosomes, each chromosome being associated with each neural network of a plurality of neural networks, each chromosome including:
        a first parameter that defines a complete initial condition of the associated neural network at commencement of a training cycle, and
        a second parameter that defines an architectural feature of the associated neural network,
    enabling an evaluation of each neural network of the plurality of neural networks based on the initial condition and the architectural feature of each neural network, to provide a measure of effectiveness associated with each chromosome, and
    enabling a selection of the preferred neural network architecture based on the measure of effectiveness associated with each chromosome.

2. The method of claim 1, wherein the first parameter includes at least one of:
    an initial node weight associated with a node of the associated neural network,
    an identification of a training parameter associated with the associated neural network,
    an index that is used to determine further parameters, and
    a selector that is used to determine a subset of parameters that are used to initialize the associated neural network.

3. The method of claim 1, wherein the second parameter includes at least one of:
    a number of node levels of the associated neural network,
    a number of nodes at each node level of the associated neural network, and
    an index that is used to determine further parameters.

4. The method of claim 1, further including
    enabling a training of each neural network of the plurality of neural networks, wherein
        the training of each neural network is based on a set of training vectors applied to each neural network, the same set of training vectors being applied to each neural network.

5. The method of claim 1, wherein the evaluation of each neural network is based on a set of evaluation vectors applied to each neural network, the same set of evaluation vectors being applied to each neural network.

6. The method of claim 1, further including
    enabling a training of each neural network of the plurality of neural networks, and wherein
    the chromosome further includes:
        a third parameter that defines a training parameter that affects the training of the associated neural network.

7. The method of claim 6, wherein the training parameter includes at least one of: a time duration limit, a quantity of input limit, a performance threshold, and an item that affects a selection of training input vectors.

8. The method of claim 1, further including:

enabling a selection of a plurality of preferred neural network architectures based on the measure of effectiveness associated with each chromosome, enabling a production of a next generation plurality of chromosomes based on the measure of effectiveness associated with each chromosome, each next generation chromosome of the next generation plurality of chromosomes having a determinable corresponding next generation neural network of a plurality of next generation neural networks, enabling an evaluation of each next generation neural network of the plurality of next generation neural networks based on the initial condition and the architectural feature of each next generation neural network, to provide a measure of effectiveness associated with each next generation chromosome, and wherein the selection of the plurality of preferred neural network architectures is further based on the measure of effectiveness associated with each next generation chromosome.

9. A method for enabling a determination of at least one preferred neural network architecture, the method comprising:

enabling a definition of a plurality of first generation network architectures, enabling a selection of a first random set of training input vectors, enabling a training of each network architecture of the plurality of first generation network architectures based on the first random set of training input vectors to form a corresponding plurality of trained first generation network architectures, enabling an evaluation of each trained first generation network architecture of the plurality of trained first generation network architectures to provide a measure of effectiveness associated with each trained first generation network architecture, enabling a definition of a plurality of second generation network architectures, based on the measure of effectiveness associated with each trained first generation network architecture, enabling a selection of a second random set of training input vectors, enabling a training of each network architecture of the plurality of second generation network architectures based on the second random set of training input vectors to form a corresponding plurality of trained second generation network architectures, enabling an evaluation of each trained second generation network architecture of the plurality of trained second generation network architectures to provide a measure of effectiveness associated with each trained second generation network architecture, enabling a selection of the at least one preferred neural network architecture based on the measure of effectiveness associated with each trained second generation network architecture.

10. A method for enabling a determination of at least one preferred neural network architecture, the method comprising:

enabling a definition of a plurality of first generation network architectures, enabling a training of each network architecture of the plurality of first generation network architectures to form a corresponding plurality of trained first generation network architectures, enabling a selection of a first random set of evaluation input vectors, enabling an evaluation of each trained first generation network architecture of the plurality of trained first generation network architectures based on the first random set of evaluation input vectors to provide a measure of effectiveness associated with each trained first generation network architecture, enabling a definition of a plurality of second generation network architectures based on the measure of effectiveness associated with each trained first generation network architecture, enabling a training of each network architecture of the plurality of second generation network architectures to form a corresponding plurality of trained second generation network architectures, enabling a selection of a second random set of evaluation input vectors, enabling an evaluation of each trained second generation network architecture of the plurality of trained second generation network architectures based on the second random set of evaluation input vectors to provide a measure of effectiveness associated with each trained second generation network architecture, enabling a selection of the at least one preferred neural network architecture based on the measure of effectiveness associated with each trained second generation network architecture.

11. A system comprising:

a neural network that provides an output vector in response to an input vector that is applied to the neural network, the output vector being dependent upon an initial condition of the neural network, and an evolutionary algorithm device, operably coupled to the neural network device, that is configured to provide:
  a network architecture parameter that affects the neural network and
  a network initialization parameter that affects the initial condition of the neural network at commencement of a training cycle based on an evaluation of an effectiveness of another output vector provided by the neural network device.

12. The system of claim 11, wherein the neural network comprises:

least one input node that receives the input vector, at least one output node that provides the output vector, and at least one intermediate node, operably coupled to the at least one input node and the at least one output node, that communicates an effect from the at least one input node to the at least one output node, the effect being dependent upon a nodal weight factor associated with the at least one intermediate node, and wherein:

the initialization parameter includes an initial value of the nodal weight factor.

13. The system of claim 12, wherein the evolutionary algorithm device comprises:

a performance evaluator that determines the effectiveness of the other output vector, an offspring generator, operably coupled to the performance evaluator, that determines the network architecture parameter and the network initialization parameter based on the effectiveness of the other output vector.

14. The system of claim 13, wherein the evolutionary algorithm device further comprises a selector that selects a better performing network based on the effectiveness of the other output vector, and wherein the offspring generator determines the network architecture parameter and the network initialization parameter based on an architecture parameter and an initialization parameter of the better performing network.

15. The system of claim 11, wherein the neural network device includes a training mode, wherein parameters of the neural network are affected by a training set of input vectors, and the evolutionary algorithm device further provides a training parameter that affects the training mode of the network architecture, based on an evaluation of the effectiveness of the other output vector.

* * * * *